(12) United States Patent
Delahunt

(10) Patent No.: US 7,284,087 B2
(45) Date of Patent: Oct. 16, 2007

(54) METHOD AND APPARATUS FOR INCREASING SUSTAINABLE BANDWIDTH IN A MULTIPLE DISK DRIVE STORAGE SYSTEM

(75) Inventor: Stephen James Delahunt, Harvard, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 391 days.

(21) Appl. No.: 10/994,991

(22) Filed: Nov. 22, 2004

(65) Prior Publication Data

US 2005/0283570 A1  Dec. 22, 2005

Related U.S. Application Data

(60) Provisional application No. 60/580,508, filed on Jun. 17, 2004.

(51) Int. Cl.
*G06F 12/00* (2006.01)
(52) U.S. Cl. .............. 711/112; 711/111; 711/114; 711/151; 711/158
(58) Field of Classification Search ........ 711/114, 711/111, 112, 151, 158
See application file for complete search history.

(56) References Cited

U.S. PATENT DOCUMENTS

| | | | | |
|---|---|---|---|---|
| 5,510,905 A * | 4/1996 | Birk | .......... | 386/125 |
| 5,737,577 A * | 4/1998 | Martini | .......... | 711/173 |
| 5,938,734 A * | 8/1999 | Yao et al. | .......... | 709/232 |
| 6,032,224 A * | 2/2000 | Blumenau | .......... | 711/117 |
| 6,076,143 A * | 6/2000 | Blumenau | .......... | 711/114 |
| 6,163,422 A * | 12/2000 | Blumenau | .......... | 360/47 |
| 6,484,235 B1 * | 11/2002 | Horst et al. | .......... | 711/114 |
| 6,591,339 B1 * | 7/2003 | Horst et al. | .......... | 711/114 |
| 6,978,345 B2 * | 12/2005 | Tomaszewski et al. | ..... | 711/112 |
| 2002/0095546 A1 * | 7/2002 | Dimitri et al. | .......... | 711/112 |
| 2003/0149834 A1 * | 8/2003 | Susnjar | .......... | 711/112 |
| 2003/0195977 A1 * | 10/2003 | Liu et al. | .......... | 709/231 |

OTHER PUBLICATIONS

Tanenbaum, "Structured Computer Organization, Third Edition," Section 1.4 Hardware, Software, and Multilevel Machines, p. 11, Hardware and software are logically equivalent., 1990.*

* cited by examiner

*Primary Examiner*—Stephen C. Elmore (57) ABSTRACT

A method of increasing sustainable bandwidth in a multiple disk storage system that comprises reading a first part of a data file from a first track location on a first hard disk drive, and reading a second part of the data file from a second track location on a second hard disk drive, wherein the average of the data transfer rates from the first track location and the second track location is greater than the data transfer rate of the first track location. The method may be used for increasing sustainable bandwidth in a multiple disk drive storage system in a computer. A system for implementing the method is also disclosed.

36 Claims, 5 Drawing Sheets

METHOD AND APPARATUS FOR INCREASING SUSTAINABLE BANDWIDTH IN A MULTIPLE DISK DRIVE STORAGE SYSTEM

CROSS-REFERENCE TO RELATED APPLICATIONS

This application claims priority to Provisional Application Ser. No. 60/580,508, filed on Jun. 17, 2004.

BACKGROUND

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Over the past few years, an increasing number of computer applications have been written or designed to provide continuous, real time flow of information across a computer network. Streaming media, such as audio or video, is one example. Streaming media servers must be able to provide access to a continuous flow of a large amount of information. For this reason, multiple disk drive systems, such as Redundant Array of Inexpensive Drives ("RAID"), are typically used to store data in systems that provide access to large amounts of data. Any system that could increase the data transfer rate, also referred to as the "bandwidth", of the multiple disk drive system would advantageously improve the efficiency of the computer systems that provide continuous data flow.

SUMMARY

In accordance with embodiments of this invention, there is provided a method of increasing sustainable bandwidth in a multiple disk storage system comprising accessing a first part of a data file from a first track location on a first hard disk drive, and accessing a second part of the data file from a second track location on a second hard disk drive, wherein an average of the data transfer rates from the first track location and the second track location is greater than the data transfer rate of the first track location.

Further, in accordance with embodiments of this invention, there is provided a computer system comprising a first hard disk drive; a second hard disk drive; and a device coupled to each of the first hard disk drive and the second hard disk drive, the device configured to access a first part of a data file from a first track location on a first hard disk drive and access a second part of the data file from a second track location on a second hard disk drive, wherein an average of the data transfer rates from the first track location and the second track location is greater than the data transfer rate from the first track location.

Additionally, in accordance with embodiments of this invention, there is provided a method of increasing sustainable bandwidth in a multiple disk storage system comprising accessing a first track location on a first hard disk drive, and accessing a second track location on a second hard disk drive, wherein a zone number of the first track location is different than a corresponding zone number of the second track location.

BRIEF DESCRIPTION OF THE DRAWINGS

Advantages of one or more disclosed embodiments may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

There are many computer applications where a single hard disk drive cannot satisfy the demands of a user regardless of its size or quality. For example, in sensitive business applications, users cannot afford any potential down time due to a single disk drive failure. One solution to this problem is to span data across multiple disk drives in an effort to mitigate the effects of a disk drive failure. One technique for storing data across multiple disk drives is to provide a Redundant Array of Inexpensive Disks or "RAID" system. As will be described in more detail below, there are many different types of RAIDs. However, a fundamental principle behind a RAID is that multiple disk drives are configured to function as a single larger disk drive. Ideally, the larger drive created by the RAID is faster, more reliable, and less expensive then a single disk drive of the same capacity. RAIDs may be created either through specialized hardware within a computer system or by software.

Since the RAID is comprised of multiple hard disk drives, it is helpful to understand how the underlying individual hard disk drives function in order to appreciate the factors that may affect RAID performance. A hard disk drive uses round, flat disks called "platters". Each of the platters is coated on both sides with a special material designed to store information in the form of magnetic patterns. The platters are mounted by cutting a hole in the center of the platter and stacking multiple platters onto a spindle. The platters rotate at high speed, and special electromagnetic read/write devices, called "heads", are used to either record information onto the platters or read information from them. The heads are mounted onto arms, all of which are mechanically connected to a single assembly and positioned over the surface of the disk by a device called an "actuator".

Figure 1:
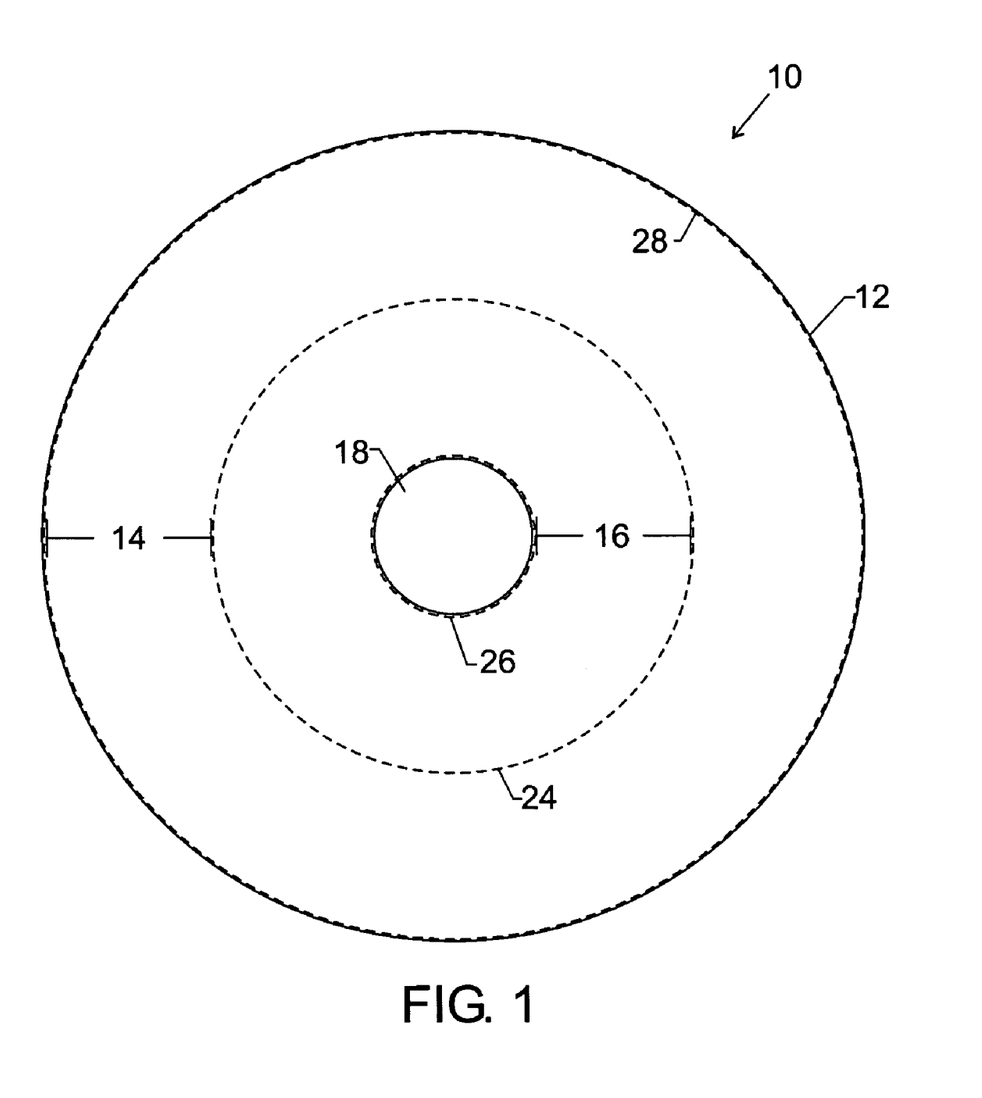
FIG. 1 is a diagram illustrating a typical disk drive platter suitable for use in accordance with embodiments of the invention.

Turning now to the drawings and referring initially to FIG. 1, a diagram illustrating a typical disk drive platter in accordance with embodiments of the invention is depicted and generally designated by the reference numeral 10. All information stored on a hard disk drive is recorded in the tracks, which are arranged in concentric circles, known as "cylinders", on the surface of the platter 10. In a typical hard disk drive each of the cylinders is assigned a "cylinder number" depending on its location on the platter. The cylinder number is typically assigned sequentially. A modern hard disk has tens of thousands of tracks on each platter 10. Each track can be further sub-divided into sectors, each of which is typically of a fixed size. FIG. 1 illustrates three cylinders, an outermost cylinder 28, an innermost cylinder 26, and an intermediate cylinder 24. The outermost cylinder 28 contains the tracks that are closest to the outer edge 12 of the platter 10 (furthest from the center 18 of the platter); the innermost cylinder 26 contains those tracks that are closest to the center 18 of the platter; and the intermediate cylinder 24 contains those tracks that are equidistant between the outermost cylinder 28 and the innermost cylinder 26. The tracks located between the outermost cylinder 28 and the intermediate cylinder 24 will be referred to as outer tracks 14 while the tracks located between the cylinder 24 and the innermost cylinder 26 will be referred to as inner tracks 16.

Typically when data is written to a disk drive, it is written to an outermost available track. The outermost available track is the track closest to the outer edge 12 of the platter 10 that is available to accept data. It should be understood, however, that depending on how much data is stored on the platter 10, the outermost available track may be one of the inner tracks 16 and may even be the inner tracks located on the innermost cylinder 26. Data may also be written to the innermost available tracks on the platter 10.

In early hard disk drives, the typical platter 10 was capable of storing approximately 1 Gigabyte (GB) of information. By 2002, the typical platter 10 was capable of storing 20 GB or more in the same amount of space. This trend continues today, and each year, new methods are developed to condense more data onto each platter. One factor that has been partially responsible for this dramatic improvement in storage capacity is improved utilization of the larger, outer tracks 14. The first hard disk drives were relatively unsophisticated, and their controllers could not handle any type of variation between the tracks. As a result, even though the outer tracks 14 may be more than twice as large as the inner tracks 16, both the inner tracks 16 and the outer tracks 14 were configured to have the same number of sectors, and thus the same storage capacity. In other words, the outer tracks 14 could only store as much data as the inner tracks 16. This configuration was very inefficient because the outer tracks 14 may have the capacity to contain many more sectors (and thus store more data) than the inner tracks 16. To overcome this inefficiency, modern hard disk drives group tracks into zones based on their distance from the center of the disk. Each zone may be assigned a different zone number and a different number of sectors per track. Moving from the innermost cylinder 26 of the disk to the outermost cylinder 28, different zones are traversed, each zone containing more sectors per track than the previous zone. This allows for more efficient use of the larger tracks on the outside of the platter 10.

One interesting effect of this design is that the data transfer rate of the disk drive is typically higher when accessing the outer tracks 14 than when accessing the inner tracks 16 (accessing is typically either reading from or writing to the disk drive). This phenomenon occurs because the outer cylinders contain more data, and the angular velocity of the platters is constant regardless of which track is being accessed. Accordingly, the heads are able to pass over more outer track sectors in the same period of time. For example, the table below shows the data transfer rates at various zones indicated by a corresponding zone number 0-14 for a hard disk drive suitable for use in accordance with embodiments of the invention. It is clear from the table that the data transfer rate decreases from the outermost cylinder 14 of the disk (zone 0) to the innermost cylinder 16 of the disk (zone 14). In fact, the data transfer rate at the outermost cylinder 14 is more than double that of the innermost cylinder 16.

| Zone | Sectors Per Track | Data Transfer Rate (Mbits/s) |
| --- | --- | --- |
| 0 | 792 | 372.0 |
| 1 | 780 | 366.4 |
| 2 | 760 | 357.0 |
| 3 | 740 | 347.6 |
| 4 | 720 | 338.2 |
| 5 | 680 | 319.4 |
| 6 | 660 | 310.0 |
| 7 | 630 | 295.9 |
| 8 | 600 | 281.8 |
| 9 | 540 | 253.6 |
| 10 | 480 | 225.5 |
| 11 | 440 | 206.7 |
| 12 | 420 | 197.3 |
| 13 | 400 | 187.9 |
| 14 | 370 | 173.8 |

Having examined the issues surrounding the data transfer rate of an individual disk drive, it may be helpful to examine the effects that the variations in data transfer rate have on multiple disk drive storage systems. As previously discussed, the most common example of a multiple disk drive storage system is a Redundant Array of Inexpensive Drives ("RAID"). The RAID is any multiple disk drive system in which data is broken down into blocks and written across at least two separate disk drives in a process known as "striping." An example of striping is presented below in the discussion of FIG. 3. Currently, there are at least six different types of RAIDS, which are know as RAID levels. Those skilled in the art will appreciate that any other form of RAID beyond the six RAID levels described below is also within the scope of this invention. The first RAID level ("Level 0 RAID") implements a striped disk array with no redundancy. A single bad sector on a single disk drive has the potential to corrupt an entire file and a complete disk drive failure will result in the loss of all data stored in the array. As such, Level 0 RAID is not preferred in critical systems where downtime may cause relatively major economic repercussions.

The next RAID level ("Level 1 RAID") utilizes mirrored devices. In other words, data is written identically to at least two disks. Thus, if one disk fails, the data can be retrieved from one of the other disks. Of course, a Level 1 RAID system requires the cost of an additional disk without increasing overall memory capacity, in exchange for decreased likelihood of data loss. The second level of RAID ("Level 2 RAID") implements an error code correction or "ECC" (also called "error check and correct") scheme where additional check disks are provided to detect single errors, identify the failed disk, and correct the disk with the error. The third level RAID system ("Level 3 RAID") stripes data at a byte-level across several drives and stores parity data in one drive. Level 3 RAID systems generally use hardware support to efficiently facilitate the byte-level striping. The fourth level of RAID ("Level 4 RAID") stripes data at a block-level across several drives, with parity stored on one drive. The parity information allows recovery from the failure of any single drive. The performance of a Level 4 RAID array is good for read requests. Writes, however, may require that parity data be updated with each write. This slows small random writes, in particular, though large writes or sequential writes may be comparably faster. Because only one drive in the array stores redundant data, the cost per megabyte of a RAID Level 4 system may be fairly low. Finally, a level 5 RAID system ("Level 5 RAID") provides block-level memory striping where data and parity information are distributed in some form throughout the disk drives in the array. Advantageously, Level 5 RAID systems may increase the processing speed of small write requests in a multi-processor system since the parity disk does not become a system bottleneck as in the level 4 RAID systems.

Figure 2:
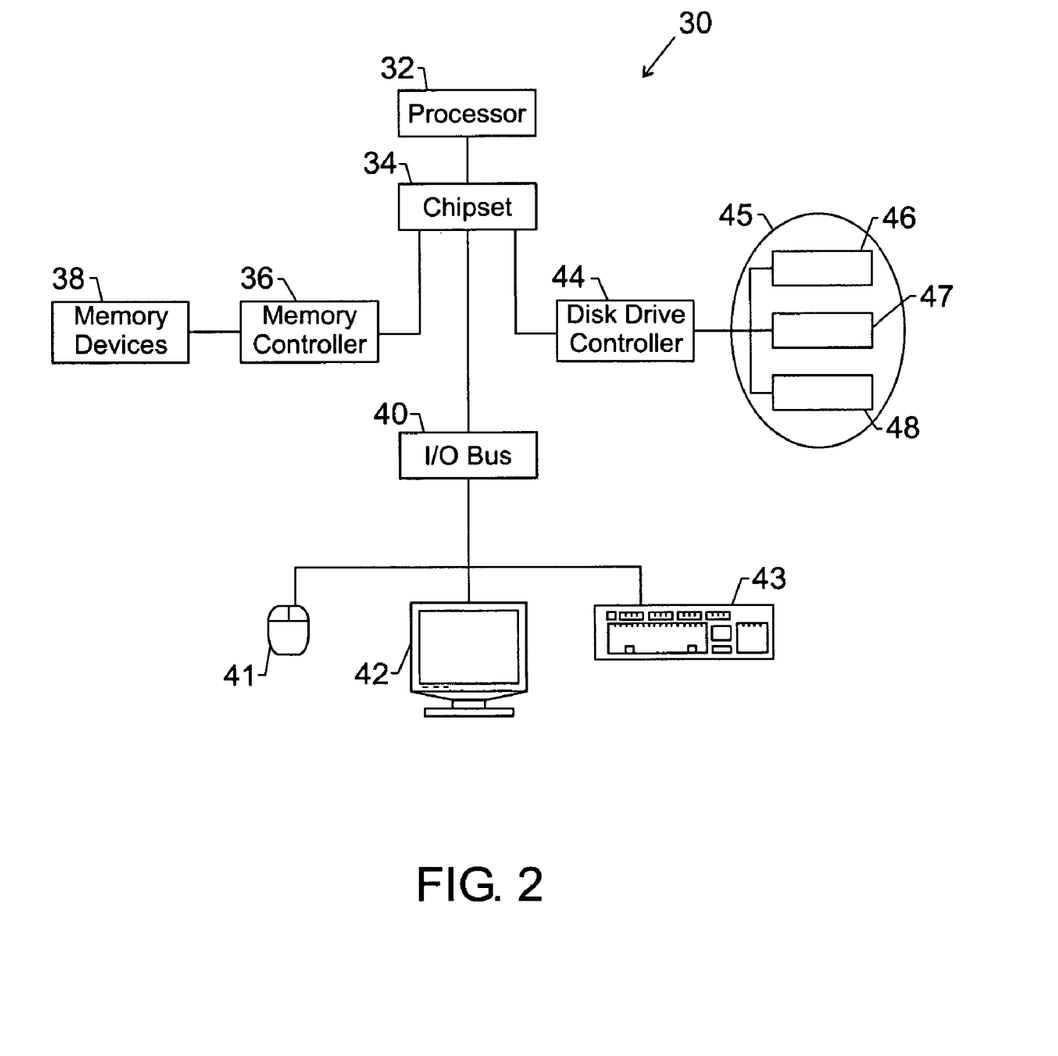
FIG. 2 is a block diagram of an exemplary system in accordance with embodiments of the invention, suitable for increasing sustainable bandwidth in a multiple disk drive storage system.

Turning now to FIG. 2, a block diagram of an exemplary system in accordance with embodiments of the invention, suitable for increasing sustainable bandwidth in a multiple disk drive storage system is illustrated and generally designated by the reference numeral 30. The system 30 may include one or more processors or central processing units ("CPUs") 32. The CPUs 32 may be used individually or in combination with other CPUs. While the CPU 32 will be referred to primarily in the singular, it will be understood by those skilled in the art that a system with any number of physical or logical CPUs 32 may be implemented. Examples of suitable CPUs include the Intel Pentium 4 Processor and the AMD Athlon Processor.

A chipset 34 may be operably coupled to the CPU 32. The chipset 34 is a communication pathway for signals between the CPU 32 and other components of the system 30, which may include, a memory controller 36, an input/output ("I/O") bus 40, and a disk drive controller 44. Depending on the configuration of the system, any one of a number of different signals may be transmitted through the chipset 34. Those skilled in the art will appreciate that the routing of signals throughout the system 30 can be readily adjusted without changing the underlying nature of the system.

The memory controller 36 may be operably coupled to the chipset 34. In alternate embodiments, the memory controller 36 may be integrated into the chipset 34. The memory controller 36 may be operably coupled to one or more memory devices 38. The memory devices 38 may be any one of a number of industry standard memory types including but not limited to single inline memory modules ("SIMMs") and dual inline memory modules ("DIMMs"). In certain embodiments of the invention, the memory devices 38 may facilitate increasing the sustainable bandwidth by storing both instructions and data. The chipset 34 may also be coupled to the I/O bus 40. The I/O bus 40 may serve as a communication pathway for signals from the chipset 34 to I/O devices such as a mouse 41, a video display 42, and/or a keyboard 43.

The disk drive controller 44 may also be operably coupled to the chipset 34. In certain embodiments, the disk drive controller 44 may also be referred to as the RAID controller. The disk drive controller 44 may control access to a RAID 45. The RAID 45 may include a first component drive 46, a second component drive 47, and a third component drive 48. It will be understood by those skilled in the art, however, that the RAID 45 may contain any number of component disk drives greater than or equal to two. The RAID 45 is shown with three component disk drives 46, 47, and 48 for illustrative purposes only. Each of the component disk drives 46, 47, and 48 may be any type of rotational disk drive. Examples of acceptable component disk drives include the 20 GB 40 GV produced by IBM and the 36.7 GB SCSI U320 produced by Seagate. All or a portion of the component disk drives 46, 47, and 48 may have the same storage capacity. Alternatively each of the disk drives 46, 47, and 48 may have a different storage capacity. The component disk drives 46, 47, and 48 and the disk drive controller 44 may communicate with each other or with the chipset 34 using any type of interface. Acceptable interfaces include but are not limited to Small Computer System Interface ("SCSI"), Integrated Drive Electronics ("IDE"), Serial Advanced Technology Attachment ("S-ATA"), Fiber Channel, IEEE 1394, Universal Serial Bus ("USB"), or Gigabit Ethernet. It will be understood by those skilled in the art that virtually any type of interface may be implemented in the system 30. Further, in alternate embodiments, the disk drive controller 44 may be integrated into the chipset 34 or operably coupled to the I/O bus 40. Similarly, the RAID 45 may alternatively be operably coupled to the chipset 34 or the I/O bus 40.

Figure 3:
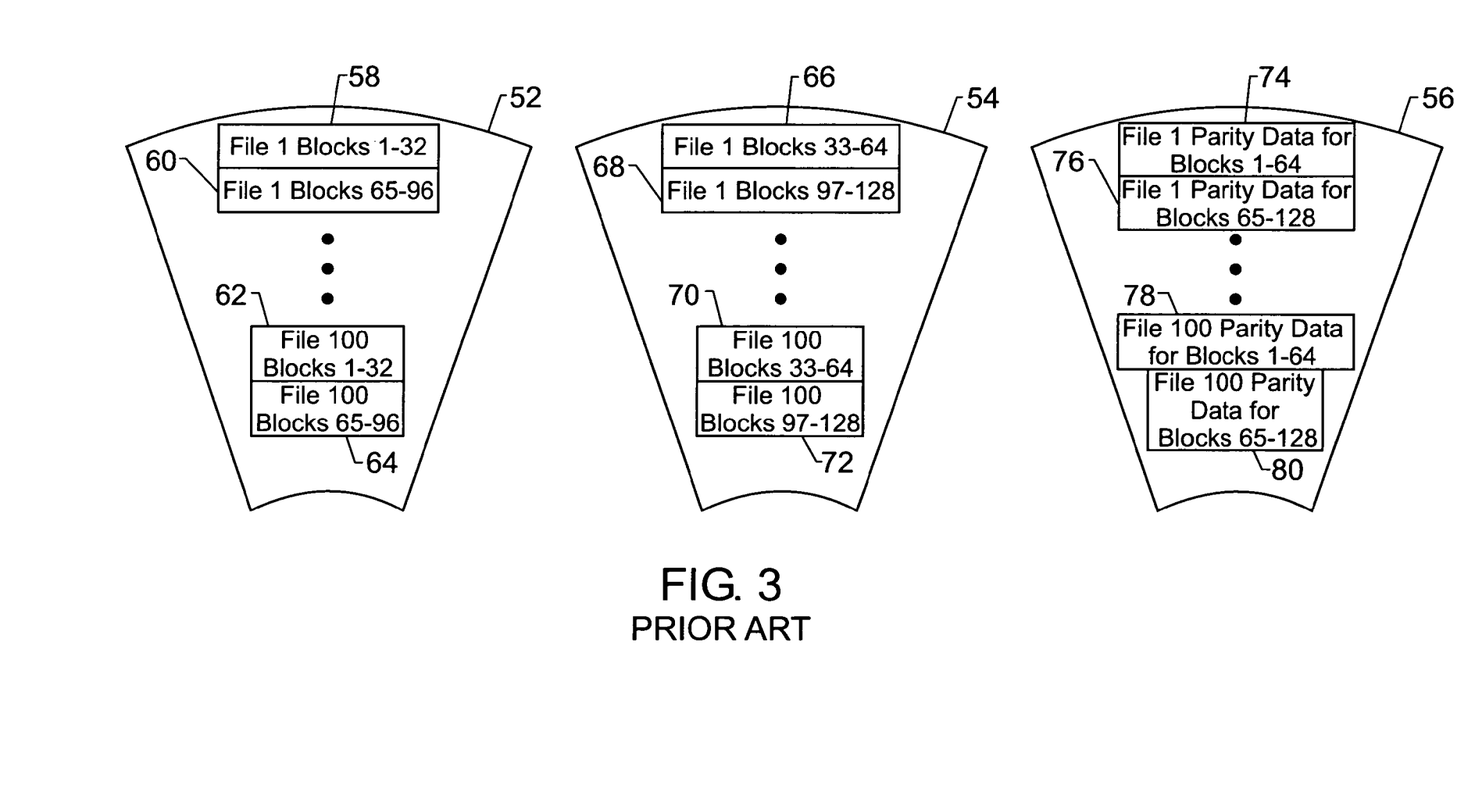
FIG. 3 is a diagram illustrating data recording on a conventional RAID system.

Referring now to FIG. 3, a diagram illustrating data recording on a conventional RAID and generally depicted by the reference numeral 50. The RAID 50 is illustrated with three component drives 52, 54, and 56, but it should be understood that the RAID 50 may have as few as two component drives. Further, while the RAID 50 is illustrated as a Level 5 RAID, any form of RAID is within the scope of this invention. Lastly, it is important to note for simplification and illustrative purposes all of the parity bits in the RAID 50 are shown on the third component disk drive 56. However, in a typical 1 Level 5 RAID, the parity bits are not localized, but are dispersed throughout the component disk drives 52, 54, and 56.

As described above, typical RAID systems implement a process known as striping to spread data across each of the component drives 52, 54, and 56. Striping is usually performed by successively accessing (typically either writing to or reading from) the same location on each of the component disk drives 52, 54, and 56. Typically, when data is written to the component disk drives 52, 54, and 56 within the RAID 50, data is first written to the outermost available tracks on each of the component disk drives. For example, on a new or newly formatted disk drive which contains no data, the first data to be written to the RAID may be written to tracks in the outermost cylinder of each member of the RAID set as previously described. As the writing of the file progresses, the RAID 50 will continue to write to the outermost available track. Thus, when all of the tracks in the outermost cylinder have been used, the RAID 50 will begin to write data to the tracks in the second-outermost cylinder, since these tracks have become the outermost available tracks. This process will continue with the RAID 50 progressing towards the innermost cylinder as more and more data files are written to the RAID 50.

An example of the striping described above may be helpful. For illustrative purposes, it will be assumed that each cylinder of each of the component drives 52, 54, and 56 holds 32 blocks of data. When data is written to the RAID 50, the first 32 data blocks 58 of a file are written into tracks in the outermost cylinder on the first component disk drive 52. The next 32 blocks 66 (i.e., blocks 33-64) of the file may then be written into tracks in the outermost cylinder of the second component disk drive 54, and the parity data for blocks 1-64, indicated by referenced numeral 74, may be written into tracks in the outermost cylinder of the third component disk drive 56. When the RAID has striped the data across each of the component disk drives 52, 54, and 56, it may return to the first component disk drive 52. Assuming as this example does, that each cylinder can only hold 32 blocks of data, the RAID 50 will write the next 32 blocks (block numbers 65-96) to the tracks located in the second outermost cylinder 60 on the first component disk drive 52. It will then write the next 32 blocks of the file (blocks 97-128) to the tracks located in the second outermost cylinder 68 on the second component disk drive 54. Lastly it will write the parity data for blocks 65-128, as indicated by reference numeral 76, to the tracks located in the second outermost cylinder 76 on the third component disk drive 56. This technique will continue until the file has been completely written and as subsequent data files are written to the RAID 50. Eventually, as each of the component disk drives 52, 54, and 56 is filled with data, the innermost tracks 62-64, 70-72, and 78-80 may be used. As stated above, this example is merely for illustrative purposes, and it will be understood by those skilled in the art that many practical considerations are involved in the actual embodiment, including accounting for the variation in storage capacity between cylinders and compensating for previously written data already stored on the component disk drives.

This method of storing data on the RAID 50 has an effect on the access speed of the RAID. Since the data transfer rate from each of the component disk drives 52, 54, and 56 decreases as data is accessed from the innermost tracks, it is clear that different files on the RAID 50 will have different data transfer rates (also referred to as "bandwidth") depending on where a particular file is stored on the component disk drives 52, 54, and 56. In a simplified example, each of the component disk drives 52, 54, and 56 in the RAID 50 can transfer 372 Mbits/s when accessing the outer tracks but only 173 Mbits/s when accessing the inner tracks. Assuming for the sake of illustration, that the RAID 50 is able to operate at an ideal transfer speed, the RAID 50 would be able to transfer 1116 M/bits/s (372 M/bits per drive ×3 component disk drives) when accessing the outer tracks, but only 519 Mbits/s (173 Mbits/s ×3 component disk drives) when accessing the inner tracks. Thus, the total bandwidth of the RAID 50 would vary from 1116 M/bits/s to 519 Mbits/s depending on which files are being accessed.

The variation in bandwidth described above should be considered when determining the sustainable bandwidth of the RAID 50. Returning to the example above, the RAID 50 will not be able to support a sustainable bandwidth higher than 519 Mbits/s because the RAID 50 could not maintain the higher bandwidth when the component disk drives 52, 54, and 56 were accessing the inner tracks. For instance, a bandwidth of 800 Mbits/s may be supportable for approximately half the stored data, but it would not be sustainable for all of the data stored on the RAID 50. Thus, in general, the sustainable bandwidth in the conventional RAID 50 is limited by the bandwidth when each of the component disk drives 52, 54, and 56 is accessing data from the innermost tracks. For obvious reasons, the variations in the bandwidth discussed above must be carefully considered when designing a computer system to provide a continuously sustainable flow of data.

Figure 4:
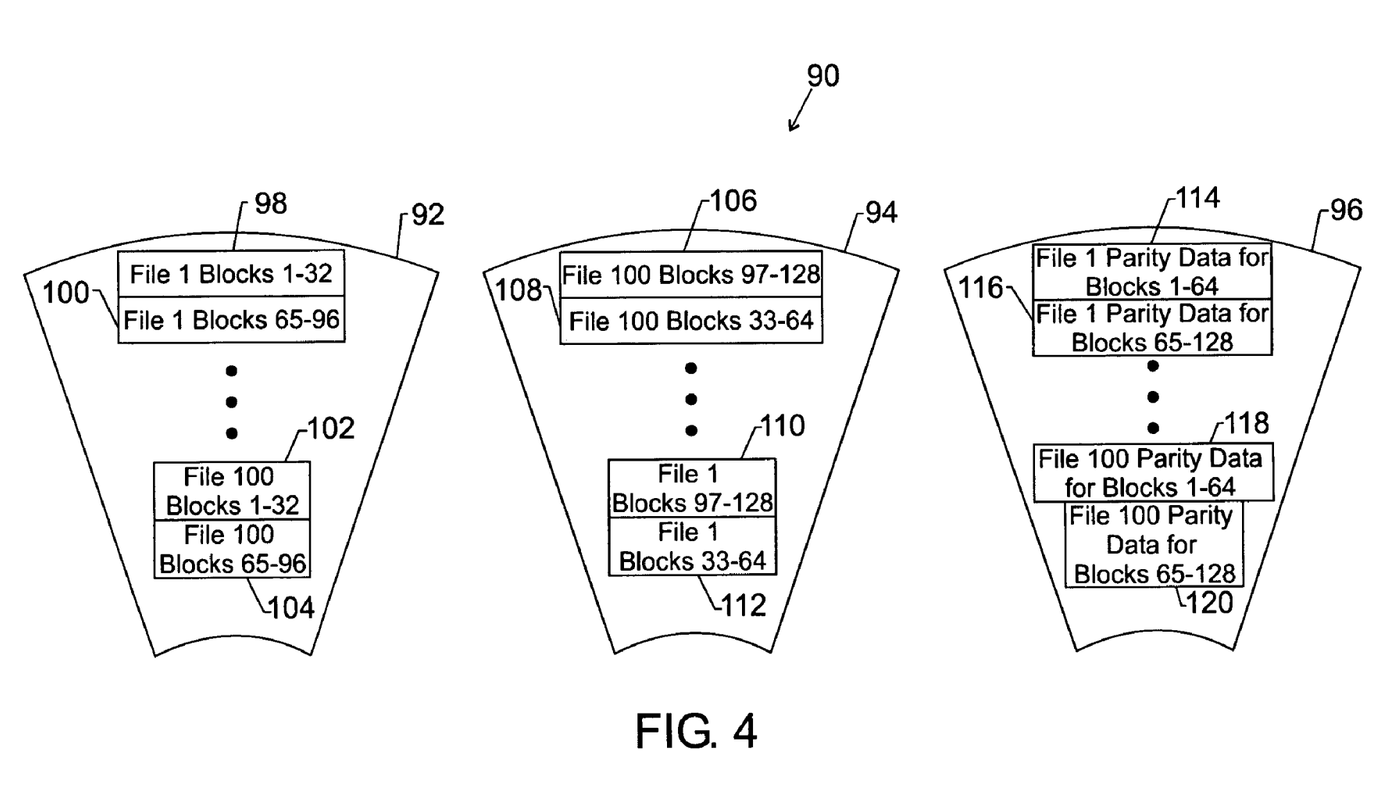
FIG. 4 is a block diagram illustrating an exemplary process in accordance with embodiments of the invention, suitable for increasing sustainable bandwidth by alternating tracks across a RAID set.

Turning now to FIG. 4, a block diagram illustrating an exemplary process for increasing sustainable bandwidth by alternating tracks across a RAID set in accordance with embodiments of the invention is depicted and generally designated by the reference numeral 90. Similar to RAID 50 depicted in FIG. 3, RAID 90 is illustrated with only three component drives 92, 94, and 96 for the sake of clarity. It should be understood that the RAID 90 may have as few as two component drives, but that the typical RAID will have more than two component drives. Further, while the RAID 90 is illustrated as a Level 5 RAID, any form of RAID is within the scope of this invention. Lastly, as discussed above, all of the parity bits in the RAID 90 are shown on the third component disk drive 96 for illustrative purposes. However, in typical Level 5 RAID, the parity bits are not localized but are instead dispersed throughout the component disk drives 92, 94, and 96.

In contrast to the conventional RAID 50 depicted in FIG. 3, the RAID 90 increases the sustainable bandwidth of the RAID by alternately accessing the inner tracks and the outer tracks of the component disk drives 92, 94, and 96. Specifically, in the RAID 90, the component disk drives 92, 94, and 96 are conceptually divided into two groups. In one embodiment, this division is performed by conceptually dividing the component disk drives into even disk drives and odd disk drives (e.g. disk drives 0, 2, 4, etc. are the even disk drives and disk drives 1, 3, 5, etc. are the odd disk drives). In the RAID 90 depicted in FIG. 4, the first component disk drive 92 and the third component disk drive 96 would belong to even disk drives, and the second component disk drive 94 would belong to the odd disk drives.

For the even disk drives, the outermost available tracks on each of the component disk drives are accessed first. For example, on a brand new or newly formatted disk drive which contains no data, the first data may be written to tracks in the outermost cylinder of each member of the even disk drives. For the even disk drives, writing may continue in the same manner described above with regard to the RAID 50 of FIG. 3.

The odd disk drives, however, will operate differently. For those component disk drives making up the odd disk drives, the innermost available tracks on each of the component disk drives are accessed first. For example, on a brand new or newly formatted disk drive which contains no data, the first data may be written to tracks in the innermost cylinder of each member of the odd disk drives. Further, when the innermost cylinder is full of data, the RAID 90 will write to the second innermost cylinder, and then the third innermost cylinder, and so forth until reaching the outermost cylinder of each component disk drive in the odd disk drives.

For example, assuming again that each cylinder of each of the component drives 92, 94, and 96 holds 32 blocks of data, when the RAID 90 begins to write data, the first 32 data blocks 98 of a file may be written into tracks in the outermost cylinder on the first component disk drive 92. In contrast to RAID 50, however, the next 32 blocks 112 of the file may then be written into tracks in the innermost cylinder of the second component disk drive 94. Lastly the parity data for blocks 1-64, as indicated by reference numeral 114, may be written into tracks in the outermost cylinder of the third component disk drive 96. When the RAID has striped across each of the component disk drives 92, 94, and 96, it may return to the first component disk drive 92.

The RAID 90 will write the next 32 blocks (block numbers 65-96) to the tracks located in the second outermost cylinder 100 on the first component disk drive 92. Next, it may write the next 32 blocks of the file (blocks 97-128) to the tracks located in the second innermost cylinder 110 on second component disk drive 94. Lastly, it will write the parity data for blocks 65-128, as indicated by reference numeral 116, to the tracks located in the second outermost cylinder on the third component disk drive 96. This technique will continue until the file has been completely written and as subsequent data files are written to the RAID 90. Eventually, as each of the component disk drives 92, 94, and 96 are close to being full, the innermost tracks 102-104 and 118-120 on the first and third component disk drives 92 and 96 and the outermost tracks 106 and 108 on the second component drive 94 may be used. As stated above, this example is merely for illustrative purposes, and it will be understood by those skilled in the art that many practical considerations are involved in the actual embodiment, including accounting for the variation in storage capacity between cylinders and compensating for previously written data already stored on the component disk drives.

This method of storing data on the RAID 90 may increase the sustainable bandwidth of the RAID 90. For example, suppose that each of the component disk drives 92, 94, and 96 in the RAID 90 can transfer 372 Mbits/s when reading from the outer tracks but only 173 Mbits/s when reading from the inner tracks and that the RAID 90 is able to operate at an ideal transfer speed. Since the RAID 90 alternates using the inner and outer tracks across the component disk drives 92, 94, and 96, it is never reading or writing to only the inner tracks 16 or only the outer tracks 14. For this reason, an average of the data transfer rates of the component disk drives 92, 94, and 96 will vary over a smaller range than the average of the data transfer rates for the conventional RAID 50, depicted in FIG. 3. Further, because the RAID 90 is never accessing only the inner tracks 16 of each of the component disk drives 92, 94, and 96, the lowest possible average of the data transfer rates of the RAID 90 will be higher than the lowest possible average of the data transfer rates for the conventional RAID 50, which can access only the inner tracks 16 of the component disk drives 52, 54, and 56.

For example, with the RAID 90, when the first and third component disk drives 92 and 96 are reading from the outer tracks at a rate of 372 Mbits/s, the second component disk drive 94 is reading from the inner tracks at a rate of 173 Mbits/s. Similarly, when the first and third component disk drives 92 and 96 are reading from the inner tracks at a rate of 173 Mbits/s, the second component disk drive 94 is reading from the outer tracks at a rate of 372 Mbits/s. Whereas the bandwidth of the RAID 50 in FIG. 3 may vary between 1116 Mbits/s and 519 Mbits/s, the bandwidth of the RAID 90 will only vary between 917 Mbits/s (372 Mbits/s×2 component disk drives+173×1 component disk drive) and 718 Mbits/s (372 Mbits/s×1 component disk drives+173×2 component disk drive). In this way, the RAID 90 increases the sustainable bandwidth to 718 Mbits/s, which is greater than the 519 Mbits/s available in the conventional RAID 50. Thus, the sustainable bandwidth of the RAID 90 increases because the lowest bandwidth available from the RAID 90 is computed from two disk drives operating at their minimum data transfer rate and one disk drive operating at its maximum data transfer rate.

It will also be appreciated that when the RAID 90 is operating at its sustainable bandwidth, an average of the data transfer rates of all three disk drives in the RAID 90 will be greater than the data transfer rate available from either of the two disk drives in the RAID 90 that are operating at their minimum data transfer rate. This is the case because an average of the data transfer rates at the sustainable bandwidth is computed by averaging the data transfer rates of two disk drives accessing data from the slower inner tracks 16 and one disk drive accessing data from the faster outer tracks 14. This average data transfer rate is obviously greater than the data transfer rate from the slower inner tracks 16 alone. Because the bandwidth of the RAID 90 can also be computed by multiplying the average data transfer rate by the number of disk drives, a higher average transfer rate will be indicative of a higher sustainable bandwidth. Thus, the RAID 90 will have a higher sustainable bandwidth than the conventional RAID 50 shown in FIG. 3 since the average data transfer rate of the RAID 50 at the sustainable bandwidth is computed solely from disk drives accessing the slower inner tracks 16. Further, because the RAID 90 may include as few as two disk drives, it will be understood that this greater average data transfer rate may be present with as few as two disk drives in the RAID 90.

The methodology for selecting and dividing the component disk drives into two groups may be varied in alternate embodiments of the invention. Additionally, it should be noted that the number of component disk drives in each of the two groups of disk drives does not have to be the same or even similar. Even a single component disk drive may be employed advantageously to increase the sustainable bandwidth of the multiple disk drive storage system. For example, an embodiment where five disk drives begin accessing data with the outer tracks 14 and only one disk drive begins accessing data with the inner tracks 16 would be within the scope of this invention.

The RAID 90 may be implemented by a variety of devices within the system 10. One of these devices is the disk drive controller 44. In this embodiment, the disk drive controller 44 works independently of CPU 12, achieving consistent performance. The configuration data for the RAID 90 may be found on every disk drive in the system 10, thereby making them available even if one of the component disk drives 92, 94, and 96 or even the disk drive controller 44 fails. The disk drive controller 44 and the component disk drives 92, 94, and 96 may be located in the same enclosure as the CPU or may be housed in a separate enclosure.

The RAID 90 may also be implemented as a software RAID. In this embodiment the CPU 12 is the device that performs the alternating of tracks across the RAID set. The CPU 12 may accomplish the alternation either through the host operating system or through a software program running in conjunction with the host operating system. For example, the Windows operating system supports grouping of multiple disk drives to form a RAID system as a standard feature. This feature or one similar to it could be modified to incorporate the alternating of tracks across the RAID instead of the conventional RAID method.

Figure 5:
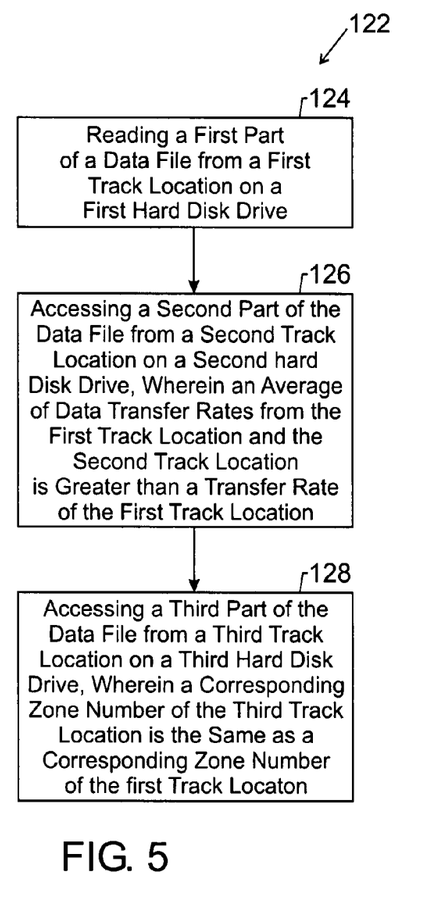
FIG. 5 is a diagram illustrating a method of increasing sustainable bandwidth in a multiple disk storage system.

Referring now to FIG. 5, one embodiment of a method of increasing sustainable bandwidth in a multiple disk storage system is provided, and generally designated by the reference numeral 122. In accordance with the present embodiment, the method 122 begins by reading a first part of a data file from a first track location on a first hard disk drive, as indicated in block 124. Next, the method 122 discloses accessing a second part of the data file from a second track location on a second hard disk drive, wherein an average of data transfer rates from the first track location and the second track location is greater than a data transfer rate of the first track location, as indicated in block 126. Finally, the method 122 discloses accessing a third part of the data file from a third track location on a third hard disk drive, wherein a corresponding zone number of the third track location is the same as a corresponding zone number of the first track location, as indicated in block 128.

Figure 6:
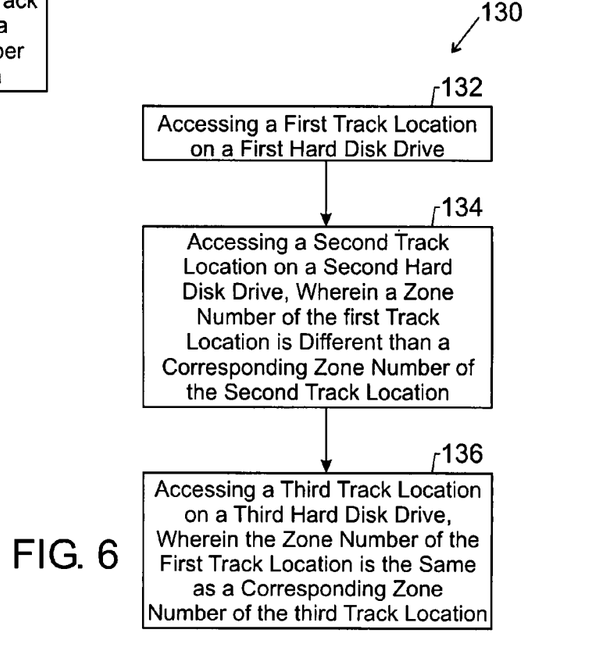
FIG. 6 is a diagram illustrating another method of increasing sustainable bandwidth in a multiple disk storage system.

FIG. 6 describes another embodiment of a method of increasing sustainable bandwidth in a multiple disk storage system, generally designated by the reference numeral 130. The method 130 discloses accessing a first track location on a first hard disk drive, as indicated in block 132. Next, the method 130 discloses accessing a second track location on a second hard disk drive, wherein a zone number of the first track location is different than a corresponding zone number of the second track location, as indicated in block 134. Finally, the method 130 discloses accessing a third track location on a third hard disk drive; wherein the zone number of the first track location is the same as a corresponding zone number of the third track location, as indicated in block 136.

Embodiments of this method and apparatus for increasing sustainable bandwidth may be applied to increase the performance of any application that requires or prefers sustainable bandwidth. As stated above, streaming media is one such example of an application that typically benefits from being able to provide real time access to a sustainable, continuous flow of a large amount of information. Increasing the continuous sustainable bandwidth of the RAIDs within streaming media servers may allow the streaming media server to support more continuous streams of data at one time. It will be appreciated by those skilled in the art that streaming media is merely one example of an application that can benefit from increased bandwidth.

The base functions described above may comprise an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain or store the instructions. The computer readable medium can be an electronic, magnetic, optical, or electromagnetic system, apparatus, or device. An illustrative, but non-exhaustive list of computer-readable mediums can include a portable computer diskette (magnetic), a random access memory (RAM), a ivad-only memory (ROM), an erasable programmable read-only memory (EPROM or Flash memory), and a portable compact disc read-only memory (CDROM) (optical). It is even possible to use paper or another suitable medium upon which the instructions are encoded. For instance, the instructions can be electronically captured via optical scanning of the paper or other medium, then compiled, interpreted or otherwise processed in a suitable manner if necessary, and then stored in a computer memory.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of increasing sustainable bandwidth in a multiple disk storage system comprising:
   reading a first part of a data file from a first track location on a first hard disk drive;
   accessing a second part of the data file from a second track location on a second hard disk drive, wherein an average of data transfer rates from the first track location and the second track location is greater than a data transfer rate of the first track location; and
   accessing a third part of the data file from a third track location on a third hard disk drive, wherein a corresponding zone number of the third track location is the same as a corresponding zone number of the first track location.

2. The method, as set forth in claim 1, wherein accessing the second part of the data file comprises reading the second part of the data file.

3. The method, as set forth in claim 1, wherein reading the first part of the data file from the first hard disk drive comprises reading the first part of the data file from the first hard disk drive located in a redundant array of inexpensive disks (RAID).

4. The method, as set forth in claim 3, wherein reading the first part of the data file from the first hard disk drive comprises reading the first part of the data file from the first hard disk drive located in a Level 5 RAID.

5. The method, as set forth in claim 1, comprising reading the first part of the data file from the first track location located within inner tracks on the first hard disk drive.

6. The method, as set forth in claim 5, comprising reading the second part of the data file from the second track location located within outer tracks on the second hard disk drive.

7. The method, as set forth in claim 1, wherein reading the first part of the data file comprises reading a first part of an audio data file.

8. The method, as set forth in claim 1, wherein reading the first part of the data file comprises reading a first part of a video data file.

9. The method, as set forth in claim 1, wherein reading the first part of the data file comprises reading a block of a data stripe.

10. The method, as set forth in claim 1, wherein the first hard disk drive comprises a small computer system interface (SCSI) disk drive.

11. The method, as set forth in claim 1, wherein the first hard disk drive comprises an integrated drive electronics (IDE) disk drive.

12. The method, as set forth in claim 1, wherein a corresponding cylinder number of the first track location is different than a corresponding cylinder number of the second track location.

13. The method, as set forth in claim 1, wherein a corresponding zone number of the first track location is different than a corresponding zone number of the second track location.

14. The method, as set forth in claim 1, wherein accessing data from the third track location on the third hard disk drive comprises accessing parity information.

15. The method, as set forth in claim 1, wherein accessing data from the third track location comprises reading data from the third track location.

16. The method, as set forth in claim 1, wherein accessing the first part of the data file comprises writing the first part of the data file.

17. The method, as set forth in claim 16, comprising writing the first part of the data file from a first hard disk drive located in a redundant array of inexpensive disks (RAID).

18. The method, as set forth in claim 16, wherein accessing the second part of the data file comprises writing the second part of the data file.

19. The method, as set forth in claim 18, comprising writing to a third track location on a third hard disk drive.

20. A computer system comprising:
   a first hard disk drive;
   a second hard disk drive; and
   a device coupled to each of the first hard disk drive and the second hard disk drive, the device operable to:

access a first part of a data file from a first track location on a first hard disk drive;

access a second part of the data file from a second track location on a second hard disk drive, wherein an average of data transfer rates from the first track location and the second track location is greater than a data transfer rate from the first track location; and access a third part of the data file from a third track location on a third hard disk drive, wherein a corresponding zone number of the third track location is the same as a corresponding zone number of the first track location.

21. The computer system, as set forth in claim 20, wherein the device comprises a disk drive controller.

22. The computer system, as set forth in claim 21, wherein the device operable to access the first part of the data file comprises a device operable to read the first part of the data file.

23. The computer system, as set forth in claim 20, wherein the device comprises a central processing unit (CPU).

24. The computer system, as set forth in claim 20, wherein the device operable to access the second part of the data file comprises a device operable to read the second part of the data file.

25. The computer system, as set forth in claim 20, wherein the device operable to access the first part of the data file comprises a device operable to write the first part of the data file.

26. The computer system, as set forth in claim 20, wherein the first hard disk drive comprises a hard disk drive that is part of a redundant array of inexpensive disks (RAID).

27. The computer system, as set forth in claim 20, wherein the first hard disk drive comprises a hard disk drive that is part of a Level 5 RAID.

28. The computer system, as set forth in claim 20, wherein the device operable to access the first and the second parts of the data file comprises a device operable to access a block of a data stripe.

29. The computer system, as set forth in claim 20, wherein the first hard disk drive is a SCSI disk drive.

30. The computer system, as set forth in claim 20, wherein the third track location on the third hard disk drive stores parity information.

31. A method of increasing sustainable bandwidth in a multiple disk storage system comprising:

accessing a first track location on a first hard disk drive;

accessing a second track location on a second hard disk drive, wherein a zone number of the first track location is different than a corresponding zone number of the second track location; and accessing a third track location on a third hard disk drive; wherein the zone number of the first track location is the same as a corresponding zone number of the third track location.

32. The method, as set forth in claim 31, wherein accessing the first track location on the first hard disk drive comprises reading from the first track location on the first hard disk drive.

33. The method, as set forth in claim 31, wherein accessing the first track location on the first hard disk drive comprises writing to the first track location on the first hard disk drive.

34. The method, as set forth in claim 31, wherein accessing the first track location on the first hard disk drive comprises accessing the first track location on a ATA hard disk drive.

35. The method, as set forth in claim 31, wherein accessing the first track location on the first hard disk drive comprises reading a block of a data stripe.

36. A computer-readable medium storing routines for execution by a computer, comprising:

a routine for reading a first part of a data file from a first track location on a first hard disk drive;

a routine for reading a second part of the data file from a second track location on a second hard disk drive, wherein a zone number of the first track location is different than a corresponding zone number of the second track location; and a routine for reading a third part of the data file from a third track location on a third hard disk drive, wherein a zone number of the third track location is the same as the zone number of the first track location.

* * * * *

UNITED STATES PATENT AND TRADEMARK OFFICE
CERTIFICATE OF CORRECTION

PATENT NO.        : 7,284,087 B2
APPLICATION NO.   : 10/994991
DATED             : October 16, 2007
INVENTOR(S)       : Stephen James Delahunt Page 1 of 1

It is certified that error appears in the above-identified patent and that said Letters Patent is hereby corrected as shown below:

In column 11, line 37, delete "ivad-only" and insert -- read-only --, therefor.

In column 14, line 23, in Claim 34, delete "ATA" and insert -- S-ATA --, therefor.

Signed and Sealed this

First Day of July, 2008

JON W. DUDAS
*Director of the United States Patent and Trademark Office*